United States Patent [19]
Arndt et al.

[11] Patent Number: 4,913,890

[45] Date of Patent: Apr. 3, 1990

[54] PREPARATION OF ACICULAR $\alpha$-$FE_2O_3$

[75] Inventors: Volker Arndt, Bobenheim-Roxheim; Helmut Auweter, Limburgerhof; Rainer Feser, Gruenstadt; Ekkehard Schwab, Neustadt, all of Fed. Rep. of Germany

[73] Assignee: BASF Aktiengesellschaft, Ludwigshafen, Fed. Rep. of Germany

[21] Appl. No.: 315,049

[22] Filed: Feb. 24, 1989

[30] Foreign Application Priority Data

Mar. 4, 1988 [DE] Fed. Rep. of Germany ....... 3807042

[51] Int. Cl.$^4$ .............................................. C01G 49/06
[52] U.S. Cl. .................................... 423/633; 423/594; 423/618; 252/62.56; 252/62.59
[58] Field of Search .......................... 252/62.56, 62.59; 423/633, 594, 618

[56] References Cited

U.S. PATENT DOCUMENTS

| | | | |
|---|---|---|---|
| 4,202,871 | 5/1980 | Matsumoto et al. | 423/632 |
| 4,379,183 | 4/1983 | Araki et al. | 252/62.56 |
| 4,774,072 | 9/1988 | Arndt et al. | 423/633 |
| 4,826,671 | 5/1989 | Arndt et al. | 423/633 |

FOREIGN PATENT DOCUMENTS

| | | | |
|---|---|---|---|
| 0237944 | 3/1986 | European Pat. Off. | |
| 0138894 | 10/1979 | Japan | 423/633 |
| 2128930 | 6/1987 | Japan | 423/633 |
| 0882939 | 11/1981 | U.S.S.R. | 423/633 |

OTHER PUBLICATIONS

JP-A 6,350,326, Patent Abstracts of Japan, vol. 12, No. 270 (1988).

*Primary Examiner*—Robert L. Stoll
*Attorney, Agent, or Firm*—Keil & Weinkauf

[57] ABSTRACT

Finely divided acicular and pore-free $\alpha$-$Fe_2O_3$ is prepared from an iron(III) salt in the presence of one or more organic substances which form complexes with iron(III) ions, in alkaline supension at from 80° to 250° C., and is used for the preparation of magnetic materials suitable for magnetic recording media.

4 Claims, No Drawings

PREPARATION OF ACICULAR α-FE₂O₃

The present invention relates to a process for the preparation of finely divided, dendrite-free and pore-free tin-containing α-Fe₂O₃ from an iron (III) salt in the presence of a substance which forms complexes with iron (III) ions, in alkaline suspension at from 80° to 250° C., and its use for the preparation of magnetic materials suitable for magnetic recording media.

In order to ensure that the magnetic particles used meet the high requirements for modern magnetic recording media, efforts have recently been made to improve the crystallographic properties of these particles. Particularly undesirable are fine holes, pores and cavities, since these have an adverse effect on the magnetic properties, and especially the formation of dendrites, since they make it more difficult to achieve the required uniform alignment of the particles on the recording medium, or prevent such alignment, and reduce the packing density.

Acicular α-Fe₂O₃ is generally used as a starting material for the preparation of acicular, magnetic particles. This is usually obtained by dehydrating acicular α-FeOOH or γ-FeOOH. In this process, the disadvantages described above, such as pores, holes and dendrites, are encountered.

Processes for the preparation of improved α-Fe₂O₃, substantially without the stated disadvantages, are described in DE-A 28 49 173 and DE-A 31 46 982. According to these publications, acicular α-Fe₂O₃ is directly synthesized from Fe(OH)₃ in alkaline suspension in the presence of growth regulators. It was also known that the particle noise of the finished recording medium can be reduced by increasing the fineness of the magnetic material used for the production of the magnetic recording media. With an increase in the fineness, corresponding to a reduction in the particle volume, the useful dynamic range of the magnetic recording medium can be increased as a result of the reduction in the noise. At the same time, more finely divided pigments make it possible to achieve a smoother surface of the magnetic layer and, via the layer/head distance improved in this manner, a higher signal level and hence an even greater dynamic range.

A process for the preparation of finely divided, acicular and pore-free α-Fe₂O₃ as an intermediate for the preparation of a magnetic material having advantageous properties is described in DE-A 36 08 540. In this process, an Sn-doped iron(III) hydroxide is prepared, filtered and washed, after which an aqueous suspension of this Sn-doped iron(III) hydroxide is heated to temperatures up to 250° C. in the presence of growth regulators. The growth regulators consist of organic compounds which form chelate complexes with iron(III) ions, and change the form of the α-Fe₂O₃ end product from the normal lamellar form to the acicular form. The presence of tin ions improves the product geometry in the desired manner. End products having substantially increased fineness (smaller diameters) are formed, the acicular shape being obtained. The disadvantage of this process is the necessity of filtering off, washing and resuspending the tin-doped iron(III) hydroxide. However, this iron(III) hydroxide is a gel-like precipitate which is very difficult to filter and wash, so that this additional process step is technically very complicated. However, experiments in which this filtration and washing were omitted led only to coarse-particled end products which were unsuitable for further processing and the intended use.

It is an object of the present invention to provide a process for the preparation of finely divided, dendrite-free and pore-free α-Fe₂O₃ from iron(III) salts, which gives finely divided end products even without the technically complicated steps of filtration and washing of the iron(III) hydroxide.

We have found that this object is achieved and that the required α-Fe₂O₃ can be prepared if tin hydroxide-containing iron(III) hydroxide is precipitated, at a pH of from 6.0 to 8.0, from an aqueous solution of an iron(III) salt in the presence of a tin salt in a concentration of from $10^{-3}$ to $4 \times 10^{-2}$ mole per mole of iron-(III) salt at from 30° to 70° C. by adding an alkali, the precipitate is stirred for from one to six hours at from 30° to 70° C., and the precipitate, as an aqueous suspension containing less than 0.6 mole of iron(III) hydroxide per liter, is then heated to 80°–250° C. at a pH of from 8.5 to 12.0, after the addition of an effective amount of one or more substances which form a complex with iron(III) ions.

To carry out the novel process, the iron(III) salt and the tin salt were precipitated together as the hydroxide from aqueous solution. Suitable iron(III) salts are the chloride and, in particular, the nitrate. In the case of the tin salts, tin(II) and tin(IV) salts can be used, tin(II) and tin(IV) chlorides or stannates generally being employed. The tin salt is advantageously added in a concentration of from $10^{-3}$ to $4.0^{-2}$ mole per mole of iron-(III) salt. The hydroxides are precipitated, according to the invention, at from 30° to 70° C., in particular from 50° to 65° C., by adding an alkali, usually sodium hydroxide solution, at a pH of from 6.0 to 8.0, advantageously from 6.5 to 7.5. The suspension of the hydroxide precipitate is then stirred for from 1 to 6, in particular from 3 to 5, hours at from 30° to 70° C., advantageously at the temperature of the preceding precipitation. The resulting iron(III) hydroxide containing tin hydroxide is then brought into contact, in the suspension, with one or more substances capable of complex formation with iron(III) ions. The amount of hydroxide precipitate in the total amount of the suspension is less than 0.6 mole/liter, since otherwise the stirrability of the suspension is too greatly reduced and undesirable coarse-particled products are obtained. At the beginning of, and during, the addition of the complex former, the pH of the suspension must be from 8.5 to 12.0 and particularly advantageously from 10.5 to 11.5. Substances which form chelate complexes with iron(III) ions are used as complex formers which influence the crystal form. α-Hydroxycarboxylic acids and organic phosphonic acids are preferred. In these groups, citric acid, tartaric acid and 1-hydroxyethane-1,1-diphosphonic acid have proven particularly useful. Their concentration depends on the iron concentration, the pH and the desired geometry of the end product. A preferred range is a total concentration of from $10^{-3}$ to $10^{-2}$ mole/liter. In the novel process, the stirred suspension is heated to the final temperature of from 80° to 250° C., preferably from 90° to 190° C. This can be carried out by rapid heating to the final temperature, rapid heating to a threshold value followed by slow heating to the final temperature, or slow heating to the final temperature. The choice of the conditions depends on the design of the kettle and the product desired. Fairly rapid heating to higher temperatures means a higher reaction rate and better spacetime yield but also higher energy costs.

When the synthesis has ended, the acicular, finely divided, pore-free α-Fe$_2$O$_3$ is filtered off, washed and dried. The particles thus obtained have a BET specific surface area of more than 18 m$^2$/g. Before further processing, it can be provided with a shape-stabilizing coating in a conventional manner. Thereafter, it is reduced to magnetite in a conventional manner in a reducing atmosphere, for example in hydrogen and/or by means of organic substances which decompose in the presence of iron oxides, the simultaneous presence of steam for avoiding reduction to metallic phases being advantageous in every case. Depending on the reducing agent and the time, which may be from 20 minutes to 3 hours, reduction temperatures of from 300° to 500° C. have proven suitable.

The magnetite obtained as an intermediate can be oxidized in a conventional manner with oxidizing gases, eg. oxygen or air, at from 180° to 350° C. Depending on the particular oxidation temperature, times of from 10 minutes to 1 hour have proven advantageous. The oxidation conditions should be chosen so that the known irreversible transformation of γ-Fe$_2$O$_3$ to α-Fe$_2$O$_3$ is avoided.

Depending on the intended use, the magnetic materials thus obtained can be modified at the surfaces with cobalt ions or cobalt/iron(II) ions to increase the coercive force.

It is also possible to reduce the starting pigments, which may or may not be shape-stabilized or modified in a known manner, by increasing the reduction potential beyond the magnetite stage, and to use the resulting metal pigments directly as magnetic pigments, after suitable passivation by means of organic solvents or by carefully passing air over them.

The novel process makes it possible to obtain finely divided, dendrite-free and pore-free α-Fe$_2$O$_3$ even without the process steps required in prior art processes, and furthermore to adjust the fineness of the end product in a controlled manner by adjusting the concentration of the hydroxide precipitate during the process.

An important intended use of the magnetic pigments obtained from the α-Fe$_2$O$_3$ pigments prepared according to the invention is as a magnetic material in the production of magnetic recording media. The recording media are produced in a conventional manner. For this purpose, the magnetic materials are dispersed in polymeric binders. Suitable binders are the compounds known for this purpose, such as homopolymer and copolymers of vinyl derivatives, polyurethanes, polyesters and the like. The binders are used as solutions in suitable organic solvents, which may contain further additives. The magnetic layers are applied to rigid or flexible bases, such as sheets, films and cards.

The Examples which follow illustrate the invention. Percentages are by weight and are based on the total compound. The magnetic properties of the powder sample were measured using a vibrating sample magnetometer, in a magnetic field of 160 kA/m. The values of the coercive force, Hc, measured in [kA/m], were based on a tap density ρ of 1.2 g/cm$^3$ in the powder measurements. The geometry of the products was obtained from electron micrographs at a magnification of 1:20,000. Here, the term needle denotes an elongated shape and not the formation of pointed ends, ie. also rectangles, etc. The BET specific surface area (SN$_2$) is determined according to DIN 66,132, using a Ströhlein areameter (Ströhlein, Düsseldorf, FRG), by the one-point difference method of Haul and Dümbgen. The results of the Examples and Comparative Experiments are summarized in a Table.

COMPARATIVE EXPERIMENT A 5 moles of Fe(NO$_3$)$_3$.9H$_2$O and 0.04 mole of SnCl$_4$ (corresponding to 8 millimoles of Sn/mole of Fe) were dissolved in 15 l of water, and 10% strength sodium hydroxide solution was added to the stirred solution at 60° C. until the pH was 8.0. The resulting suspension of doped iron(III) hydroxide (Fe(OH)$_3$ below) was stirred for a further 5 hours at 60° C. and filtered over a filter press. The precipitate was resuspended once in cold water and again filtered over the filter press. The precipitate thus obtained was suspended in water so that the resulting iron concentration corresponded to a content of 0.60 mole of Fe(OH)$_3$ per liter of suspension. Thereafter, 0.90 millimole/liter of citrate and 2.00 millimole/liter of 1-hydroxyethane-1,1-diphosphonic acid were added to the suspension and the pH was brought to 10.8. The prepared reaction mixture was heated in an autoclave for 6 hours at 170° C., while stirring. The finished product was filtered off and dried. Acicular and pore-free α-Fe$_2$O$_3$ which was pure according to X-ray analysis and had a specific surface area of 25.1 m$^2$/g was obtained.

COMPARATIVE EXPERIMENT B 5 moles of Fe(NO$_3$)$_3$.9 H$_2$O and 0.04 mole of SnCl$_4$ (corresponding to 8 millimoles of Sn/mole of Fe) were precipitated and worked up as described in Comparative Experiment A. The precipitate thus obtained was suspended in water so that the resulting iron concentration corresponded to a content of 0.90 mole of Fe(OH)$_3$ per liter of suspension. Thereafter, 1.00 millimole/liter of citrate and 2.90 millimoles/liter of 1-hydroxyethane-1,1-diphosphonic acid were added to the suspension and the pH was brought to 10.8. The prepared reaction mixture was heated in an autoclave for 6 hours at 170° C., while stirring. The finished product was filtered off and dried. Acicular and pore-free α-Fe$_2$O$_3$ which was pure according to X-ray analysis and had a specific surface area of 25.1 m$^2$/g was once again obtained.

COMPARATIVE EXPERIMENT C 5 moles of Fe(NO$_3$)$_3$.9H$_2$O and 0.04 mole of SnCl$_4$ (corresponding to 8 millimoles of Sn/mole of Fe) were precipitated (at 50° C.) and worked up as described in Comparative Experiment A. The precipitate thus obtained was suspended in water so that the resulting iron concentration corresponded to a content of 0.45 mole of Fe(OH)$_3$ per liter of suspension. Thereafter, 0.90 millimole/liter of citrate and 1.70 millimoles/liter of 1-hydroxyethane-1,1-diphosphonic acid were added to the suspension and the pH was brought to 10.8. The prepared reaction mixture was heated in an autoclave to 170° C. in the course of 10 hours, while stirring. The finished product was filtered off and dried. Acicular and pore-free α-Fe$_2$O$_3$ which was pure according to X-ray analysis and had a specific surface area of 26.0 m$^2$/g was once again obtained.

COMPARATIVE EXPERIMENT D 5 moles of Fe(NO$_3$)$_3$.9H$_2$O and 0.04 mole of SnCl$_4$ (corresponding to 8 millimoles of Sn per mole of Fe) were precipitated and worked up as described in Comparative Experiment A. The precipitate thus obtained was suspended in water in a glass apparatus lined with plastic, so that the resulting iron concentration corresponded to a content of 1.35 moles of Fe(OH)$_3$ per liter of suspension. Thereafter, 0.90 millimole/liter of tartaric acid and 3.20 millimoles/liter of citrate were added to the suspension and the pH was brought to 11.3. The finished reaction mixture was heated to 100° C. in the course of 2 hours and then at 100° C. for a further 30 hours, while stirring. The finished product was filtered off and dried. Acicular and pore-free α-Fe$_2$O$_3$ which was pure according to X-ray analysis and had a specific surface area of 26.1 m$^2$/g was once again obtained.

COMPARATIVE EXPERIMENT E

In a glass apparatus lined with plastic, 0.36 mole of Fe(NO$_3$)$_3$.9H$_2$O and 2.93 millimoles of SnCl$_4$.5H$_2$O (corresponding to 8.15 millimoles of Sn/mole of Fe) were dissolved in 0.6 l of H$_2$O and precipitated as the hydroxide at 60° C. and at a pH of 8.0. The precipitate thus obtained was stirred for 4 hours at 60° C., 0.90 millimole/liter of tartaric acid and 3.20 millimoles/liter of citrate were added and the pH was brought to 10.8. Thereafter, the stirred reaction mixture was heated to 100° C. in the course of 1 hour and then at 100° C. for a further 15 hours. The finished product was filtered off and dried. Acicular and pore-free α-Fe$_2$O$_3$ which was pure according to X-ray analysis and had a specific surface area of 13.4 m$^2$/g was obtained.

COMPARATIVE EXPERIMENT F

In a glass apparatus lined with plastic, 0.36 mole of Fe(NO$_3$)$_3$.9H$_2$O was dissolved in 0.6 l of H$_2$O and precipitated as the hydroxide at 60° C. and at a pH of 8.0. The precipitate thus obtained was stirred for 4 hours at 60° C., 0.90 millimole/liter of tartaric acid and 3.20 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray and analysis and had a specific surface area of 8.1 m$^2$/g was obtained.

EXAMPLE 1

In a glass apparatus lined with plastic, 0.15 mole of Fe(NO$_3$)$_3$.9H$_2$O and 2.4 millimoles of SnCl$_4$.5H$_2$O (corresponding to 16.0 millimoles of Sn/mole of Fe) were dissolved in 0.6 l of H$_2$O and precipitated as the hydroxide at 60° C. and at a pH of 8.0. The precipitate thus obtained was stirred for 4 hours at 60° C., and 0.90 millimole/liter of tartaric acid and 3.10 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray analysis and had a specific surface area of 36.9 m$^2$/g was obtained.

EXAMPLE 2

In a glass apparatus lined with plastic, 0.21 mole of Fe(NO$_3$)$_3$.9H$_2$O and 3.6 millimoles of SnCl$_4$.5H$_2$O (corresponding to 17.1 millimoles of Sn/mole of Fe) were dissolved in 0.6 l of H$_2$O and precipitated as the hydroxide at 60° C. and at a pH of 8.0. The precipitate thus obtained was stirred for 4 hours at 60° C., 0.90 millimole/liter of tartaric acid and 2.70 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray analysis and had a specific surface area of 32.3 m$^2$/g was obtained.

EXAMPLE 3

In a glass apparatus lined with plastic, 0.21 mole of Fe(NO$_3$)$_3$.9H$_2$O and 2.4 millimoles of SnCl$_4$.5H$_2$O (corresponding to 11.4 millimoles of Sn/mole of Fe) were dissolved in 0.6 l of H$_2$O and precipitated as the hydroxide at 60° C. and at a pH of 8.0. The precipitate thus obtained was stirred for 4 hours at 60° C., 0.90 millimole/liter of tartaric acid and 3.20 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray analysis and had a specific surface area of 27.2 m$^2$/g was obtained.

EXAMPLE 4

In a glass apparatus lined with plastic, 0.21 mole of Fe(NO$_3$)$_3$.9H$_2$O and 1.2 millimoles of SnCl$_4$.5H$_2$O (corresponding to 5.7 millimoles of Sn/mole of Fe) were dissolved in 0.6 l of H$_2$O and precipitated as the hydroxide at 60° C. and at a pH of 8.0. The precipitate thus obtained was stirred for 4 hours at 60° C., 1.20 millimoles/liter of tartaric acid and 3.70 millimoles/liter of citrate were added and the pH was brought to 11.3. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray analysis and had a specific surface area of 23.2 m$^2$/g was obtained.

EXAMPLE 5

In a glass apparatus lined with plastic, 0.21 mole of Fe(NO$_3$)$_3$.9H$_2$O and 6.0 millimoles of SnCl$_4$.5H$_2$O (corresponding to 28.6 millimoles of Sn/mole of Fe) were dissolved in 0.6 l of H$_2$O and precipitated as the hydroxide at 60° C. and at a pH of 8.0. The precipitate thus obtained was stirred for 3 hours at 60° C., 0.90 millimole/liter of tartaric acid and 2.70 millimoles/liter of citrate were added and the pH was brought to 10.8. Thereafter, the stirred reaction mixture was heated to 100° C. in the course of 1 hour and then at 100° C. for a further 10 hours. The finished product was filtered off and dried. Acicular and pore-free α-Fe$_2$O$_3$ which was pure according to X-ray analysis and had a specific surface area of 23.0 m$^2$/g was obtained.

EXAMPLE 6

In a glass apparatus lined with plastic, 0.27 mole of Fe(NO$_3$)$_3$.9H$_2$O and 4.8 millimoles of SnCl$_4$.5H$_2$O (corresponding to 17.8 millimoles of Sn/mole of Fe) were dissolved in 0.6 of H$_2$O and precipitated as the hydroxide at 60° C. and at a pH of 8.0. The precipitate thus obtained was stirred for 4 hours at 60° C., 0.90 millimole/liter of tartaric acid and 2.80 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free α-Fe$_2$O$_3$ which was pure according to X-ray analysis and had a specific surface area of 18.7 m²/g was obtained.

EXAMPLE 7

In a glass apparatus lined with plastic, 0.21 mole of Fe(NO$_3$)$_3$.9H$_2$O and 2.4 millimoles of SnCl$_2$ (corresponding to 11.4 millimoles of Sn/mole of Fe) were dissolved in 0.6 l of H$_2$O and precipitated as the hydroxide at 60° C. and at a pH of 8.0. The precipitate thus obtained was stirred for 3.5 hours at 60° C., 0.90 millimole/liter of tartaric acid and 3.40 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free $\alpha$-Fe$_2$O$_3$ which was pure according to X-ray analysis and had a specific surface area of 27.0 m²/g was obtained.

EXAMPLE 8

In a glass apparatus lined with plastic, 0.21 mole of Fe(NO$_3$)$_3$.9H$_2$O and 6.0 millimoles of SnCl$_2$ (corresponding to 28.6 millimoles of Sn/mode of Fe) were dissolved in 0.6 l of H$_2$O and precipitated as the hydroxide at 60° C. and at a pH of 8.0. The precipitate thus obtained was stirred for 5 hours at 60° C., 0.90 millimole/liter of tartaric acid and 3.40 millimoles/liter of citrate were added and the pH was brought to 10.8. Thereafter, the stirred reaction mixture was heated to 100° C. in the course of 1 hour and then at 100° C. for a further 20 hours. The finished product was filtered off and dried. Acicular and pore-free $\alpha$-Fe$_2$O$_3$ which was pure according to X-ray analysis and had a specific surface area of 31.5 m²/g was obtained.

Thereafter, the stirred reaction mixture was heated in an autoclave for 6 hours at 170° C. The finished product was filtered off and dried. Acicular and pore-free $\alpha$-Fe$_2$O$_3$ which was pure according to X-ray crystallography and had a specific surface area of 20.2 m²/g was obtained.

EXAMPLE 9b 0.025 mole of Fe(NO$_3$)$_3$.9H$_2$O and 0.04 millimole of SnCl$_4$.5H$_2$O (corresponding to 11.4 millimoles of Sn/mole of Fe) were dissolved in 0.1 l of H$_2$O and precipitated as the hydroxide at 60° C. and at a pH of 8.0. The precipitate thus obtained was stirred for 5 hours at 60° C., 0.90 millimole/liter of citrate and 1.50 millimole/liter of 1-hydroxyethane-1,1-diphosphonic acid were added and the pH was brought to 10.8. Thereafter, the stirred reaction mixture was heated in an autoclave for 6 hours at 170° C. The finished product was filtered off and dried. Acicular and pore-free $\alpha$-Fe$_2$O$_3$ which was pure according to X-ray analysis and had a specific surface area of 21.8 m²/g was obtained.

EXAMPLE 10

80 g of the product from Example 7 were treated in a known manner with 0.6% of PO$_4$ to stabilize the shape, 2.5% of a stearic acid were added and the product was reduced to magnetite in a rotary furnace for 30 minutes at 450° C. in a stream of 50 l (S.T.P.)/h of hydrogen, diluted with a stream of 50 l (S.T.P.)/h of nitrogen. Before entering the reduction tube, the H$_2$ stream was passed through water at 40° C. After the reduction had ended, the magnetite sample was oxidized to $\gamma$-Fe$_2$O$_3$ in a furnace of identical design in the course of 30 minutes at 280° C. with air. The finished product had a coercive force of 28.7 kA/m.

TABLE

| Comp. Expt. | Fe conc. | Sn dop. | Heating time | Tar conc. | Ci conc. | Ph conc. | Temperature program | SN$_2$ |
|---|---|---|---|---|---|---|---|---|
| A | 0.6 | 8.0 | 5 | | 0.9 | 2.0 | 6 h 170° C. | 25.1 |
| B | 0.9 | 8.0 | 5 | | 1.0 | 2.9 | 6 h 170° C. | 25.1 |
| C | 0.45 | 8.0 | 5 | | 0.9 | 1.7 | 10 h 100° C. | 26.0 |
| D | 1.35 | 8.0 | 4 | 0.9 | 3.2 | | 30 h 100° C. | 26.1 |
| E | 0.6 | 8.15 | 4 | 0.9 | 3.2 | | 15 h 100° C. | 13.4 |
| F | 0.6 | 0 | 4 | 0.9 | 3.2 | | 20 h 100° C. | 8.1 |
| 1 | 0.25 | 16.0 | 4 | 0.9 | 3.1 | | 20 h 100° C. | 36.9 |
| 2 | 0.35 | 17.1 | 4 | 0.9 | 2.7 | | 20 h 100° C. | 32.3 |
| 3 | 0.35 | 11.4 | 4 | 0.9 | 3.2 | | 20 h 100° C. | 27.2 |
| 4 | 0.35 | 5.7 | 4 | 1.2 | 3.7 | | 20 h 100° C. | 23.2 |
| 5 | 0.35 | 28.6 | 3 | 0.9 | 2.7 | | 10 h 100° C. | 23.0 |
| 6 | 0.45 | 17.8 | 4 | 0.9 | 2.8 | | 20 h 100° C. | 18.7 |
| 7 | 0.35 | 11.4 | 3.5 | 0.9 | 3.4 | | 20 h 100° C. | 27.0 |
| 8 | 0.35 | 11.4 | 5 | 0.9 | 3.4 | | 20 h 100° C. | 31.5 |
| 9a | 0.35 | 11.4 | 5 | | 0.9 | 1.5 | 6 h 170° C. | 20.2 |
| 9b | 0.35 | 11.4 | 5 | | 0.9 | 1.4 | 6 h 170° C. | 21.8 |

Explanations:
Fe conc.: Iron concentration in moles/liter
Sn dop.: Tin doping in millimoles of Sn/mole of Fe
Heating time: Duration of the subsequent stirring time at 60° C. after precipitation as iron(III) hydroxide, in h
Tar conc.: Tartaric acid concentration in millimoles/liter
Ci conc.: Citrate concentration in millimoles/liter
pH conc.: 1-hydroxyethane-1,1-diphosphonic acid concentration in millimoles/liter
Temperature program: Duration and temperature during the synthesis after the addition of the complex former
SN$_2$: Specific surface area in m²/g

EXAMPLE 9a 1.75 moles of Fe(NO$_3$)$_3$.9H$_2$O and 0.02 millimole of K$_2$SnO$_3$.3H$_2$O (corresponding to 11.4 millimoles of Sn/mole of Fe) were dissolved in 5.0 l of H$_2$O and precipitated as the hydroxide at 60° C. and at a pH of 8.0. The precipitate thus obtained was stirred for 5 hours at 60° C., 0.90 millimole/liter of citrate and 1.50 millimoles/liter of 1-hydroxyethane-1,1-diphosphonic acid were added and the pH was brought to 10.8.

We claim:
1. In an improved process for the preparation of finely divided, dendrite-free and pore-free tin-containing $\alpha$-Fe$_2$O$_3$ by precipitating iron(III) hydroxide from an aqueous solution of iron(III) salt in the presence of tin ions at a pH of from 6.0 to 8.0 by adding an alkali metal hydroxide to an aqueous iron(III) salt solution containing from $10^{-3}$ to $4 \times 10^{-2}$ mole of tin salt per mole of iron(III) salt at a temperature of from 30° to 70° C. and heating the aqueous suspension of iron(III) hydroxide at a temperature of from 80° to 250° C. at a pH of from 8.5 to 12.0 after the addition of at least one compound capable of forming complexes with iron(III) ions, the improvement which comprises: heating the precipitated iron(III) hydroxide in the form of the resulting unfiltered aqueous suspension containing less than 0.6 mole of iron(III) hydroxide per liter.

2. The process of claim 1, wherein the complex former is an organic compound which forms chelate complexes with iron(III) ions.

3. The process of claim 2, wherein the complex former, selected from the group consisting of the α-hydroxycarboxylic acids and of the organic phosphonic acids, is added in a concentration of from $10^{-2}$ to $10^{-3}$ mole per liter of suspension.

4. The process of claim 2, wherein the iron and tin salts are iron(III) chloride or nitrate or tin(II) or tin(VI) chlorides or stannates.

* * * * *